(No Model.) 2 Sheets—Sheet 1.
N. W. WHEELER, Dec'd.
C. H. WHEELER, Administratrix.
AIR OR GAS COMPRESSOR.
No. 490,526. Patented Jan. 24, 1893.
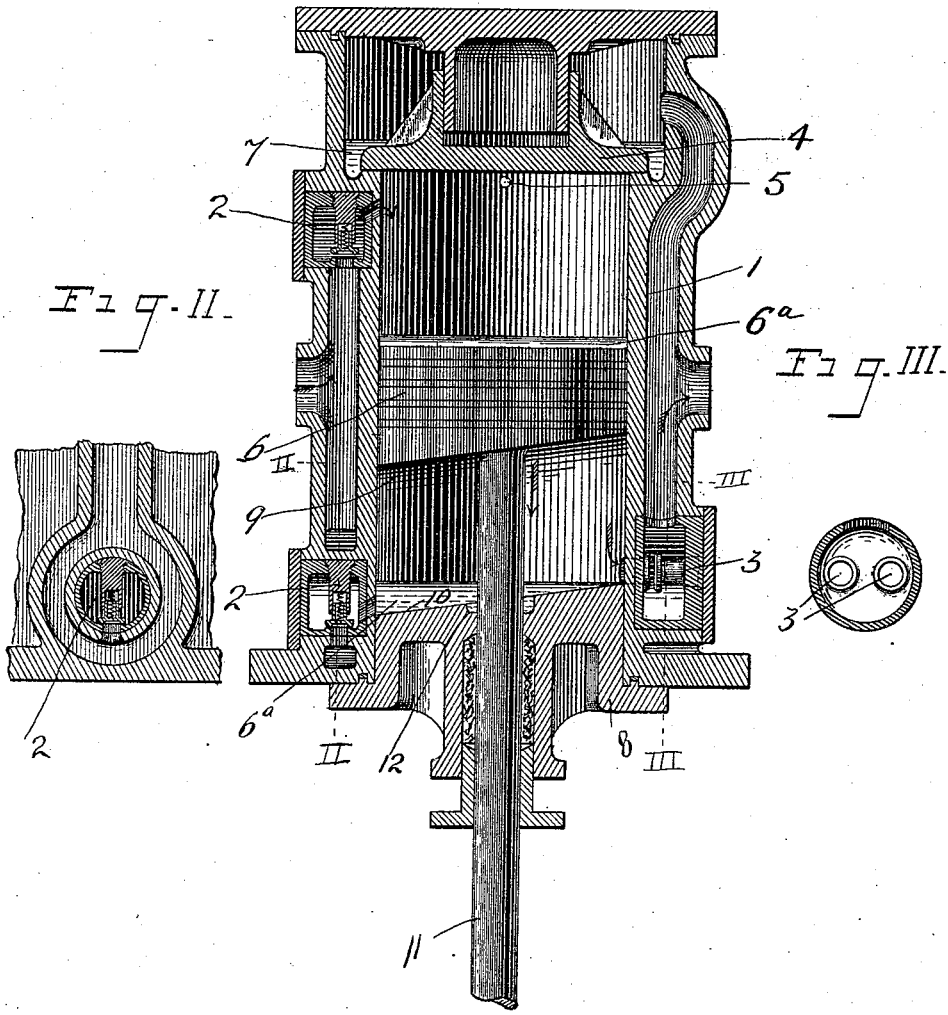
Witnesses:
Geo. H. Knight, Jr.
Lillie Hanna
Clara Hope Wheeler
Admin Estate of
Norman W. Wheeler
Inventor (Dec'd)
By Strich & Bro
Attys (No Model.) 2 Sheets—Sheet 2.
N. W. WHEELER, Dec'd.
C. H. WHEELER, Administratrix.
AIR OR GAS COMPRESSOR.
No. 490,526. Patented Jan. 24, 1893.
Fig. IV.
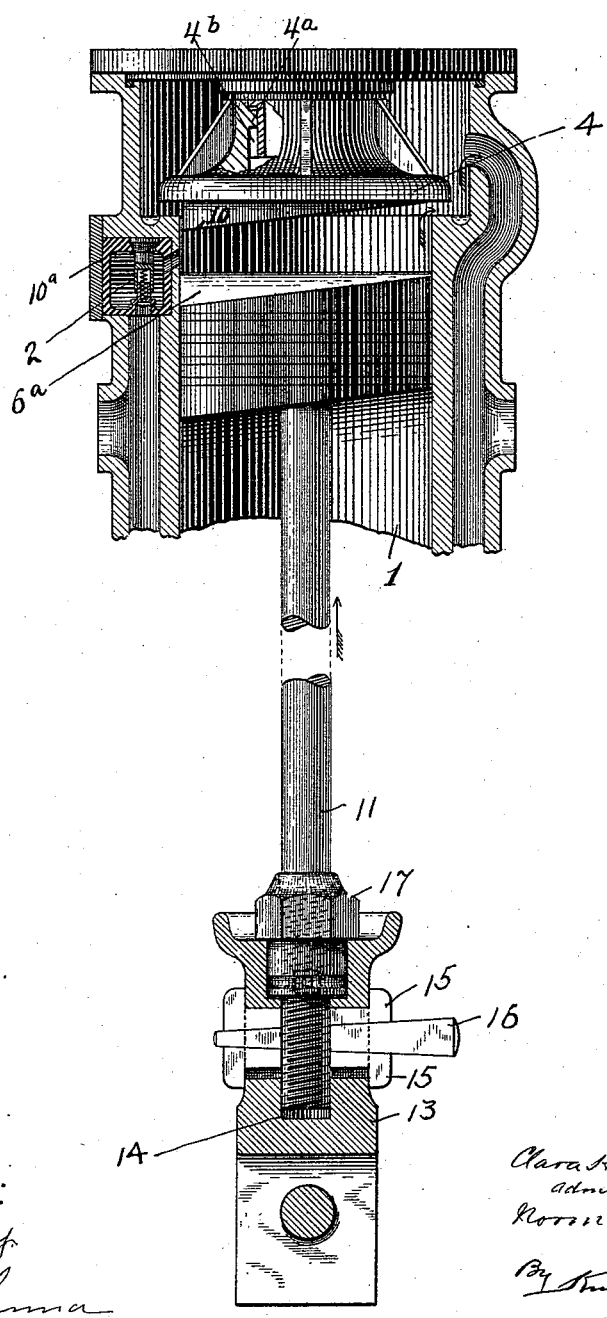
Witnesses:
Geo. H. Knight
Lillie Hanna
Clara Hope Wheeler
admin* Estate of
Norman W. Wheeler
Inventor (dec'd)
By Knight & Bros
Attys

UNITED STATES PATENT OFFICE.

CLARA HOPE WHEELER, ADMINISTRATRIX OF NORMAN W. WHEELER, DECEASED, OF NEW YORK, N. Y.

AIR OR GAS COMPRESSOR.

SPECIFICATION forming part of Letters Patent No. 490,526, dated January 24, 1893.

Application filed February 27, 1892. Serial No. 423,047. (No model.)

*To all whom it may concern:*

Be it known that NORMAN W. WHEELER, deceased, late of New York, in the county and State of New York, did in his life-time invent certain new and useful Improvements in Air or Gas Compressors, of which the following is a specification.

It is customary in gas compressors to seal and lubricate the parts with a certain quantity of oil injected into each end of the cylinder as the piston reciprocates and ejected with the compressed gas. In a vertically acting compressor the oil offers to the flat face of the piston a resistance unyielding in proportion to the rapidity of reciprocation of the piston resulting in a severe shock or pounding action of the two flat surfaces.

The object of the present invention is to do away with this pounding action by so shaping the opposing face or faces of the piston and cylinder head or piston and large discharge valve that the piston or the cylinder head (or valve) will enter the oil with a shearing stroke and drive it to one side of the cylinder and so out through the exit valves. While there have been forms of piston and cylinder head before suggested or used in the arts, departing from the old construction in which flat parallel faces opposed each other on the two parts, there has been it is believed nothing before suggested which would successfully operate first: to cause a gradual entrance of the piston or cylinder head or large valve into the oil; second, a driving of all of the gas off of the oil's surface and through the exit ports as the oil is penetrated and third, the driving of all the oil except that which seals the clearance spaces off to one side of the cylinder away from the inlet ports and through the exit ports or valves. In the present invention this result is accomplished by slanting the opposing faces of the piston and cylinder head or piston and large discharge valve at one or both ends of the cylinder in parallel planes, the lower side of the slant being on the inlet and the higher on the outlet side of the cylinder. Suitable means are provided for preventing rotation of the piston so that the opposing planes are maintained in exact parallel relation.

Referring to the accompanying drawings which form a part of this specification:—Figure I is a sectional view of the parts of a compressor embracing the invention, the invention being shown applied to the lower end thereof. Fig. II is a sectional view through the inlet valve casing on the line II—II, Fig. I. Fig. III is a sectional view of the outlet valve casing on the line III—III, Fig. I, but omitting the valves. Fig. IV is a sectional view of part of a compressor illustrating the application of the invention to both sides of the piston and further illustrating the method of attaching the piston rod to the cross-head.

The construction of the compressor in general may be selected from any well known pattern. An upright cylinder 1 is shown provided with usual inlet ports and valves 2; two small discharge valves and ports 3 arranged at the bottom of the cylinder and a large discharge valve 4 arranged at the top thereof.

Nothing is herein claimed as novel in any of the forms of the parts above referred to, except that the application of the present invention to the compressor renders it possible to arrange the small outlet valves 3 in the same horizontal plane as shown in Fig. III both substantially on a level with the lower end of the cylinder. One or more of such valves may be used at each end of the cylinder.

In practice, there is injected into each end of the cylinder through small openings, one of which is shown at 5 in Fig. I a sufficient quantity of sealing and lubricating oil; and as shown in said figure at $6^a$, $6^a$, this oil rests on the tops of the piston 6 and of the lower cylinder head 8. With the opposing faces of the piston and cylinder head flat and parallel as shown at the upper end of Fig. I (with regard to the piston and discharge valve) there is a pounding action of the flat surface if the oil strikes the flat cylinder head or large discharge valve. This action is relieved at the upper end of the cylinder by using the large discharge valve 4 as shown in Fig. I which yields under the impact of the piston and the oil carried thereby allowing the oil to flow out around it with the gas and just as the piston starts to descend the valve drops again to its seat. The issuing oil then immediately settles around the valve as shown at 7 to form a seal. But at the lower end of the cylinder no such relieving action takes place when the surfaces of the piston and cylinder head are made flat. The cylinder head 8 is bolted to the cylinder 1 and if flat surfaces are employed here on the cylinder head and piston the pounding action is very severe.

One inventor has suggested a method of discharging the gas and oil by arranging the discharge valves at the bottom of the cylinder one above the other and when the piston is at the bottom end of its stroke it closes the lower outlet valve, and the gas and oil pass through valves and ports located in the piston and thence through the upper discharge valve in the cylinder. But not only does this plan fail to relieve the pounding of the flat surfaces but it involves the making of the piston with numerous valves and crevices which must be sealed and through which leakages occur.

In the present invention a solid piston is used, and the invention consists in forming the surface or surfaces 9 of the piston and the opposing surface or surfaces 10 of the cylinder head or heads slanting and parallel. The slant is so arranged that the outlet valves 3 are located at the summit thereof and thus, when the piston descends its lower side enters like a wedge the body of oil 6ª at a point located distant from the discharge valves so that it penetrates the oil without shock, forces all the gas over the surface of the oil as it penetrates and out through the outlet valves 3 and causes the oil to follow the gas. Preferably a cavity is made in the head 8 around the piston rod 11 as shown at 12 to retain a sufficient quantity of oil to lubricate and seal the bearing of said rod.

Referring to Fig. IV it will be seen that as the piston rises, the oil, resting on the side of the piston next the inlet port will flow into the cavity of the port and valve casing 2, and then, as the piston moves farther it will close said port at about the moment that the surface of the oil strikes the inclined under surface of the large discharge valve 4 and is forced to the other side of the cylinder and out.

The depression of the side of the piston remote from the discharge pipe provides a pocket whereby a sufficient quantity of oil is left on the upper side of the piston. And similarly referring to Fig. I, the depression of the side of the cylinder head 8 remote from the discharge valves insures the retention in the lower end of the cylinder of sufficient oil. In the ordinary construction with the face of the lower cylinder head made flat and the discharge valve port flush therewith the oil is discharged from the cylinder in advance of the gas which leaves a clearance space between the piston and the cylinder head at the completion of the stroke which is filled with gas to re-expand on the return stroke of the piston. But in the present construction the body of oil remains upon the inclined surface of the cylinder head, while the gas is being forced out of the cylinder through the outlet valves by the descending piston until the piston actually strikes and begins to enter the oil at the point remote from the discharge ports or valves on the opposite side of the piston. And then as the piston enters the oil, it forces the last remaining portion of the gas off the surface of the oil, through the discharge ports and causes the proper amount of oil to follow it, leaving only a sufficient amount to fill the clearance spaces.

In the above description reference is made only to the application of the invention to the lower end of the cylinder. In Fig. IV the invention is shown applied to the upper end of the cylinder and piston also.

While the invention may be applied to a compressor in which the upper end of the cylinder is a duplicate of the lower end as already described, the present drawings show in Fig. IV an instance where instead of such construction, a large discharge valve 4 is used at the upper end, which valve has a projection 10ª on its lower face of the same diameter as and entering the upper end of the cylinder and having the inclined face 10 on its under side to correspond with the inclined upper face of the piston. The upper valve is prevented from turning by feather 4ª and groove 4ᵇ or otherwise. In the same figure one means is shown of preventing the rotation of the piston rod so that the inclined surface or surfaces thereof may be constantly maintained parallel with the opposing surface or surfaces of the cylinder head or upper discharge valve or both. 13 represents the cross-head. The lower end of the piston rod 11 is screw-threaded and the cross-head 13 is provided with a smooth faced socket 14 large enough to receive the end of the piston rod. Gibs 15 and a wedge or key 16 pass through a slot in the piston rod and one in the cross-head. 17 is a nut screwed on the piston rod above the cross-head. By screwing down on this nut the cross-head portion between the nut and the gibs is clamped on the rod and by loosening the nut and driving in or out the key 16, the piston rod may be shortened or lengthened without turning it. The cross-head being held as usual from rotation by its guides on the frame (not shown) of the compressing cylinder, its connection by gib and slot with the piston rod insures the firm retention of the latter from rotation.

Having thus described the invention, the following is what is claimed as new therein and desired to be secured by Letters Patent:

1. In a compressor, the combination of the upright cylinder and piston, the opposing face of the cylinder head and the piston being slanted from one side to the other in parallel planes whereby all the gas is forced out, and also all the oil except enough to seal the clearance spaces.

2. The combination of the cylinder whose head 8 has the inclined inner surface 10 slanted continuously from one side to the other and the outlet port or ports situated at the summit of said slant on one side of the cylinder and the piston having the face opposite to said head formed with a corresponding parallel slant, substantially as set forth.

3. The combination of the upright cylinder, the large discharge valve at one end thereof having a slanted inner surface, and a valveless piston in said cylinder having its surface opposite to said valve formed with a corresponding parallel slant substantially as set forth.

4. The combination of the cylinder, the large discharge valve at one end thereof having a projection of the same diameter as and entering the base of the cylinder and formed with a slanted surface, and the valveless piston having a correspondingly slanted surface on the side opposite to said valve substantially as set forth.

5. The combination of the piston having the slanting face or faces 9 and the correspondingly slanted cylinder head having the oil cavity 12 around the piston rod, for sealing the bearing of and lubricating said rod substantially as and for the purposes set forth.

CLARA HOPE WHEELER,
*Administratrix of Norman Wheeler, deceased.*

Witnesses:
ALEXANDER STONDART,
WM. BATES.